United States Patent
Kumpfmüller

(10) Patent No.: US 7,234,363 B2
(45) Date of Patent: Jun. 26, 2007

(54) MASS FLOW METER

(75) Inventor: Hans-Georg Kumpfmüller, Gleiszellen-Gleishorbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/567,288

(22) PCT Filed: Jul. 29, 2004

(86) PCT No.: PCT/EP2004/008527

§ 371 (c)(1),
(2), (4) Date: Feb. 3, 2006

(87) PCT Pub. No.: WO2005/017469

PCT Pub. Date: Feb. 24, 2005

(65) Prior Publication Data

US 2007/0017304 A1    Jan. 25, 2007

(30) Foreign Application Priority Data

Aug. 4, 2003  (DE) ................. 103 35 665

(51) Int. Cl.
*G01F 1/84* (2006.01)

(52) U.S. Cl. .............................. 73/861.357
(58) Field of Classification Search ........... 73/861.357, 73/861.355, 861.356

See application file for complete search history.

(56) References Cited

U.S. PATENT DOCUMENTS

| 4,852,409 | A | * | 8/1989 | Herzl ................... 73/861.356 |
| 5,069,075 | A | | 12/1991 | Hansen et al. |
| 5,359,881 | A | * | 11/1994 | Kalotay et al. ............ 73/54.06 |
| 5,996,650 | A | * | 12/1999 | Phallen et al. ............. 141/83 |
| 6,327,915 | B1 | * | 12/2001 | Van Cleve et al. ..... 73/861.357 |

FOREIGN PATENT DOCUMENTS

| DE | 196 20 079 C2 | 8/2001 |
| EP | 1 281 938 A2 | 2/2003 |

* cited by examiner

*Primary Examiner*—Jewel Thompson

(57) ABSTRACT

The invention relates to a mass flow meter for flowing media, which operates according to the Coriolis principle. At least one oscillator and at lest one sensor that detects Coriolis forces and/or oscillations based on Coriolis forces are mounted on a Coriolis measuring tube. As evaluation unit determines a measured flow valve from the measurement signal of the sensor. Means are provided which make it possible to detect zero flow in the measuring tube regardless of the detection of Coriolis forces and/or oscillations based on Coriolis forces and generate a corresponding measurement signal. Said means can comprise a sensor for measuring a flow according to a magnetic-inductive measuring method, the method for measuring the difference in propagation time or the Doppler method with the aid of noise signals, a differential pressure method, a calorimetric method, and/or a float-type measuring method, for example, whereby the problem or a measuring error caused by zero displacement is resolved in mass flow meters operating according to the Coriolis principle.

5 Claims, 1 Drawing Sheet

MASS FLOW METER

CROSS REFERENCE TO RELATED APPLICATIONS

This application claims priority to the German application No. 10335665.7, filed Aug. 4, 2003, and to the International Application No. PCT/EP2004/008527, filed Jul. 29, 2004 which are incorporated by reference herein in their entirety.

FIELD OF INVENTION

The invention relates to a mass flow meter for flowing media, which operates according to the Coriolis principle.

BACKGROUND OF INVENTION

This type of mass flow meter for flowing media, which operates according to the Coriolis principle, is known for example from DE 196 20 079 C2. This document describes mass flow meters of which the Coriolis measuring tube is embodied as a straight tube and also those with a curved, especially loop-shaped Coriolis measuring tube. A distinction is also made between mass flow meters which only feature one Coriolis measuring tube and those with two Coriolis measuring tubes. In the embodiments with two Coriolis measurement tubes, these can be positioned in series or parallel as regards flow technology. With mass flow meters with two straight or curved measuring tubes these tubes are mostly identically embodied in pairs and are arranged and made to oscillate so that they oscillate against one another. The position of the mass center point remains constant in this case and forces arising are compensated for. The positive consequence of this is that the oscillating system has no effect externally. No oscillations are therefore introduced into the pipework system into which such a mass flow meter is built and conversely oscillations in the pipework system do not influence the measurement result if the mass flow meter is of an appropriate design.

SUMMARY OF INVENTION

For mass flow meters operating according to the Coriolis principle and featuring just one straight Coriolis measuring tube, this positive consequence of measurement tubes oscillating against one another is not produced. The mass center point does not remain constant and forces arising are not compensated for. The result is that one the one hand oscillations are transmitted into the pipework system into which such a mass flow meter is built and that on the other hand oscillations of the pipework system can influence the measurement result.

However, mass flow meters operating according to the Coriolis principle with only one straight Coriolis measuring tube do also have significant advantages over other mass flow meters which feature two straight measurement tubes or at least one curved measurement tube. Compared to the meters with two measurement tubes, one advantage above all can be seen in the fact that no flow divider and no flow combiner are needed which make it impossible to clean the measuring tube system with a cleaning element passed through it, for example a salamander. In addition a straight measurement tube is comparatively simple as regards its mechanical design and consequently is able to be manufactured at relatively low cost. Furthermore the inner surfaces of the measuring tube are easy to work and can be polished without difficulty so that the pressure loss with a measuring tube of this type is comparatively small.

Usually with a mass flow meter with one straight measuring tube an oscillation generator is arranged in the middle of the tube which makes the measurement tube oscillate at its resonant frequency. Upstream and downstream from the oscillation generator oscillation detectors are arranged as sensors, between the signals of which a phase difference can be evaluated as a measurement signal for a flow. In practice such an arrangement frequently delivers a phase difference deviating from zero even if there is no flow present in the measuring tube. The reasons for this can be stress forces, differing temperature stresses, unevenness in the pipe material, phase errors in the detectors or the associated circuits of an evaluation unit and much more besides. It is thus necessary to perform a calibration for the phase difference present without flow after the mass flow meter has been installed in a pipe of a process control system to enable the effects of these types of error sources to be compensated for. So that the required accuracy is also achieved after lengthy periods in operation the calibration must be repeated at regular intervals.

It would be conceivable for example, for manual calibration of the mass flow meter, at zero flow, to close a valve connected in series with the mass flow meter in the same pipe in order to explicitly set a zero flow. If the measured value output by the mass flow meter deviates from zero, new calibration data to compensate from the error could be defined and stored in a memory to compensate for errors in later measurement operation. If necessary such measures could naturally also be performed with the other types of Coriolis mass flow meters already described above. However such a process would involve great expense.

An object of the invention is to create a mass flow meter for flowing media which operates according to the Coriolis principle and of which the outstanding feature is especially its improved measurement accuracy at zero flow.

This object is achieved by the claims. Advantageous developments of the mass flow meter are described in the dependent claims.

The advantage of the invention is that the zero point variations resulting from the effects described above which primarily affect the measurement result in the detection of Coriolis forces and oscillations based on Coriolis forces, can be reliably detected an d thus corrected since the mass flow meter is provided with means by which a zero flow in the measuring tube can be established independently of this detection. Advantageously it is thus no longer necessary, for exact zero point setting of a Coriolis flow meter, to achieve an exactly balanced-out oscillation system. In particular an expensive balancing-out of the system by an additional mass which previously usually had to be mechanically coupled to the measuring tube for the purpose can be dispensed with. The improved insensitivity as regards the balancing-out of the oscillation system has the further advantage that one and the same mass flow meter can be used for a further range of the specific density of the medium flowing through the measuring tube. By contrast a mass flow meter previously had to be optimized for a specific range of the density. If there was a change of medium the measuring device would have to be replaced by another measuring device optimized to the density of the new medium or a number of measuring devices each for different ranges of the specific density would have to be provided. Advantageously, as a result of the rectification of the measured value error at zero flow, just one meter is sufficient in many areas of application for measurement of the mass flow for the various media to be considered.

An automatic calibration when a zero flow is established advantageously enables manual calibration processes to be avoided. As a means by which a zero flow can be determined in the measuring tube independently of the detection of Coriolis forces and of oscillations acting on Coriolis forces, a sensor for flow measurement in accordance with the magnetic-inductive measurement principle, a sensor for flow measurement by means of noise signals in accordance with the difference in propagation method and/or the Doppler method, a sensor for flow measurement in accordance with the differential pressure method, in accordance with a calorimetric method and/or in accordance with a float-type measuring method can be used. All sensors have the advantage of being able to be manufactured at comparatively low cost since with these types of sensors comparatively simple means of establishing the zero flow are already sufficient. Thus for example, with a flow measurement sensor operating on the magnetic-inductive measurement principle, it is simply sufficient to monitor for a disappearance of the electrode voltage. When a sensor is used for flow measurement by means of noise signals in accordance with the difference in propagation time method, two sound converters are normally arranged axially offset to each other on opposing sides of the pipe wall, which are operated alternately as ultrasound transmitter and ultrasound receiver. In this case the propagation time of the sound wave is measured upstream and downstream and the difference is calculated from the propagation times. Because of the reciprocity principle zero point deviations are suppressed and an exact determination of the zero flow thereby achieved. Since the sensor is used merely to determine the zero flow and not for quantitative measurement of a flow, a dependency of the measurement on the flow profile is of no significance and a comparatively low-cost sensor can be used.

The invention is used to particular advantage with a mass flow meter with a straight Coriolis measuring tube, since the zero flow measurement according to the Coriolis principle is particularly difficult here, as already explained above.

An arrangement of the additional sensor in the area of the start of the measuring tube and/or the end of the measuring tube has the advantage, that the amplitudes of the oscillations are particularly low at these points and the measurement of the flow in accordance with the Coriolis principle is consequently especially little influenced by the additional mass of the sensor.

The invention is able to be implemented at especially low cost if the evaluation unit used for processing and evaluating the signal delivered by the additional sensor is the unit which is already present for carrying out the measurement of the mass flow in accordance with the Coriolis principle.

BRIEF DESCRIPTION OF THE DRAWINGS

The invention, along with its embodiments and advantages, is explained in greater detail below with reference to the drawings in which an exemplary embodiment of the invention is shown.

The FIGS. show.

DETAILED DESCRIPTION OF INVENTION

Figure 1:
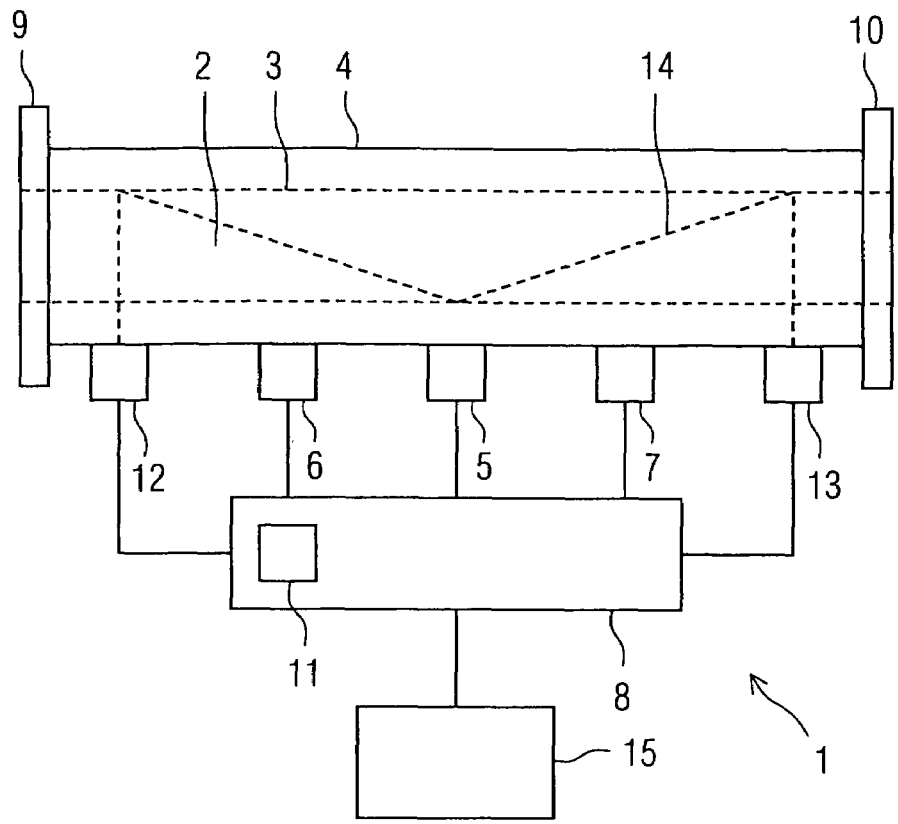
FIG. 1 a block diagram of a mass flow meter.

A mass flow meter 1 as shown in FIG. 1 operates according to the Coriolis principle. On grounds of clarity a housing, which does not however usually have to be present, has not been shown in the drawing. A flowable medium 2 flows through a channel 3 of a measuring tube 4 which in the exemplary embodiment shown is a straight tube, on which an oscillation generator operates such that the measuring tube 4 is excited into oscillations in a running direction at right angles to the axis of the tube. A sensor 6 and a sensor 7 serve to detect the Coriolis forces and/or the oscillations of the measuring tube 4 based on the Coriolis forces which arise as a result of the mass of the flowing medium 2. As a rule two sensors are used for this purpose, as shown here in the exemplary embodiment and the phase displacement between the oscillations detected is evaluated as a measurement signal in an evaluation unit 8, which also controls the oscillation generator 5. Unlike in the exemplary embodiment shown, the measuring tube can of course have other geometries, for example a curved measuring tube axis, or a different number and arrangement of oscillation generators and oscillation sensors can be chosen. However in such cases the problem already mentioned at the start of this document of mass flow meters operating according to the Coriolis principle arises, of a displacement in the zero point during operation, i.e. the level of the measuring signal at which no flow is present in the measuring tube 4 and consequently of outputting a measured value "0". Reasons for this can for example be variable stress forces which are coupled into the measuring tube 4 when the meter is fitted into an existing pipe of a process control installation using two flanges 9 and 10, variations in temperature stress etc. The position of the zero point is taken into consideration by the evaluation unit with reference to calibration data which is stored in a memory 11 in the evaluation unit. On the basis of the stored calibration data the evaluation unit 8 determines a measured value as a function of the measuring signal which is output on the display 15 or transmitted, via a field bus not shown in the FIGS., to a higher-ranking control station. From time to time a new calibration is also required in which new calibration data for rectifying a measurement error is determined and stored in the memory 11 for taking account of further measurements. So that the mass flow meter 1 can be calibrated at zero flow, this value must first be established reliably and with high accuracy. Two additional sensors 12 and 13 in the exemplary embodiment shown, which can be operated alternately as ultrasound transmitter and receiver, are used for this purpose. For operation of the ultrasound measuring path an ultrasound signal travels through the medium 2 along an essentially M-shaped measurement path 14. The propagation times are measured in both directions of travel and the propagation time difference calculated. The sensors 12 and 13 are activated and the signals that they provide are evaluated by the evaluation unit 8. Because of the reciprocity principle applicable to the ultrasound measurement method selected, a comparatively high accuracy is achieved, especially for zero flow measurement.

The two additional sensors 12 and 13 are arranged in the edge area of measurement tube 4 in the vicinity of the flanges 9 and 10 so that they are subject to the smallest possible oscillations and have no practical effect on the oscillation behavior of the measurement tube 4 for the flow measurements according to the Coriolis principle.

Figure 2:
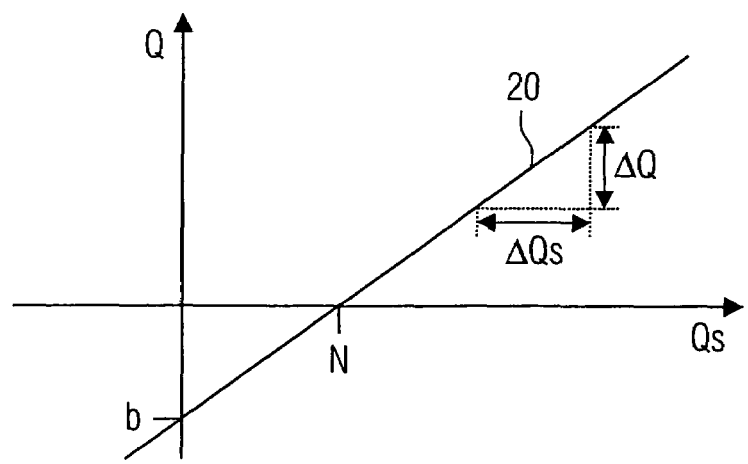
FIG. 2 a diagram to explain the calibration data.

The principle of calculating new calibration data is explained below with reference to FIG. 2, in which a straight line 20 is plotted on the diagram for the example of a linear dependency between a measurement signal Qs which is created as a function of Coriolis forces and/or oscillations based on Coriolis forces, and measured value Q stored in evaluation unit 8 (FIG. 1) determined on the basis of the stored calibration data. The measurement signal Qs is entered on the abscissa, the measured value Q on the ordinate.

The dependency of the measured value Q on the measurement signal Qs can be described by an equation $$Q = a \cdot Qs + b,$$

with a gradient a and a displacement b as parameters, which are stored as calibration data. The gradient a can be calculated as the change ΔQ of the measured value Q which is to be output for a change ΔQs of the measurement signal Qs. The gradient a can be determined in a conventional way and is not dealt with by this application. A zero point N is entered on the abscissa, said point specifying the amount by which a measurementsignal Qs generated with the aid of the sensors 6 and 7 in accordance with the Coriolis principle deviates from the ideal value Qs=0 at zero flow. With a knowledge of the gradient a of the straight line 20, which essentially depends on the geometry and the rigidity of the measuring system and thereby barely changes over the duration of operation, it is a simple matter to undertake a recalibration of the calibration data if the zero point N changes, as soon as a zero flow has been established by the additional sensors 12 and 13 (FIG. 1). The new displacement b is calculated as the negative product of the gradient a and the newly determined zero point N and is stored in the memory 11 for error compensation with future measurements. At the same time as the zero flow is determined the measured value "0" can be output by the mass flow meter.

In the exemplary embodiment described and shown in FIG. 1 two sensors 12 and 13 are used to establish the zero point. Embodiments which differ from the one described, which make do with just one sensor, are obviously possible. This is for example the case if a sensor for flow measurement using the magnetic-inductive measuring principle, using a calorimetric method or using a metering float-type measuring method is used for determining a zero flow. Sensor 13 in FIG. 1 would then be omitted for example. On the other hand, if a sensor in accordance with the differential pressure method is used, the use of two pressure sensors as sensors 12 and 13 is advantageous. In an alternative with a sensor for flow measurement using noise signals in accordance with the Doppler principle, basically just one additional sensor in addition to the sensors used for the Coriolis measurement is required.

The invention claimed is:

1. A mass flow meter for measuring a flow of a flowing medium, the mass flow meter configured to operate according to the Coriolis principle and comprising:
   a Coriolis measuring tube;
   at least one oscillation generator acting on the Coriolis measuring tube;
   at least one first sensor for detecting Coriolis forces or oscillations caused by Coriolis forces and for generating a first measurement signal;
   an evaluation unit configured to determine and output a measured value representing the flow of the flowing medium based on at least the first measurement signal; and
   at least one second sensor configured to measure the flow according to a flow measuring method not based on the Coriolis principle and to detect a zero flow in the measuring tube not using the detected Coriolis forces or oscillations caused by the Coriolis forces, the second sensor generating a second measurement signal indicating a detected zero flow, wherein the evaluation is further configured to calculate the flow additionally using the second measurement signal, if the flow is comparable to the zero flow as indicated by the second measurement signal.

2. The mass flow meter in accordance with claim 1, wherein the flow measuring method is chosen from the group consisting of a magnetic-inductive measuring principle, a method using noise signals and based on detecting a delay difference of the noise signals, a Doppler method, a differential pressure method, a calorimetric method and a float-type metering method.

3. The mass flow meter in accordance with claim 1, wherein the evaluation unit is further configured to:
   calculate the measured value based on stored calibration data dependent on the first measurement signal, and
   generate and store additional calibration data if a zero flow is detected as indicated by the second measurement signal.

4. The mass flow meter in accordance with claim 1, wherein the Coriolis measuring tube has a straight form.

5. The mass flow meter in accordance with claim 1, wherein the second sensor is arranged on one end of the measuring tube.

* * * * *